United States Patent
Mitchell

(10) Patent No.: US 7,852,834 B2
(45) Date of Patent: Dec. 14, 2010

(54) TEMPORARY ENUM GATEWAY

(75) Inventor: Don Mitchell, Bellevue, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 0 days.

(21) Appl. No.: 11/400,279

(22) Filed: Apr. 10, 2006

(65) Prior Publication Data

US 2006/0227959 A1    Oct. 12, 2006

Related U.S. Application Data

(60) Provisional application No. 60/670,279, filed on Apr. 12, 2005.

(51) Int. Cl.
*H04L 12/66* (2006.01)
(52) U.S. Cl. ............. 370/353; 370/259; 370/352; 370/354; 370/355; 370/395.54; 379/45; 379/201.01; 379/201.12; 379/218.01; 379/258; 455/414.1; 455/445; 455/461; 709/202; 709/203; 709/242
(58) Field of Classification Search ............ 379/221.01, 379/219, 211.01, 45–46, 201.01–201.02, 379/201.12, 218.01, 221.06–221.07, 221.13, 379/258; 370/259, 351–356, 395.5, 395.54; 455/414.1, 445, 461; 709/201–203, 242–244
See application file for complete search history.

(56) References Cited

U.S. PATENT DOCUMENTS

| | | | |
|---|---|---|---|
| 4,625,081 A | | 11/1986 | Lotito |
| 5,712,900 A | * | 1/1998 | Maupin et al. ............ 455/433 |
| 5,937,344 A | * | 8/1999 | Zicker .................... 455/404.1 |
| 6,275,937 B1 | | 8/2001 | Hailpern |
| 6,438,223 B1 | | 8/2002 | Eskafi et al. |
| 6,535,743 B1 | * | 3/2003 | Kennedy et al. ......... 455/456.1 |
| 6,556,816 B1 | * | 4/2003 | Gafrick et al. .......... 455/404.1 |

(Continued)

FOREIGN PATENT DOCUMENTS

WO    WO/2004021726    3/2004

OTHER PUBLICATIONS http://en.wikipedia.org/wiki/IMSI, Wekipedia Encyclopedia, International Mobile Subscriber Identity, pp. 1-4, printed on Sep. 4, 2008.*

(Continued)

*Primary Examiner*—Hemant Patel
(74) *Attorney, Agent, or Firm*—William H. Bollman

(57) ABSTRACT

A temporary ENUM architecture assigns a temporary ENUM at call time. For an originated communication requiring routing to a party which needs a particular callback format not supported, the TempENUM provides consistency with the specific format required by the receiving party. The TempENUM is assigned for the duration of the call or communication, or for a given amount of time thereafter. The TempENUM service gateway includes a TempENUM database, a module that assigns a suitable TempENUM at the time of call routing, and a module that handles a lookup in the TempENUM database, and maps the assigned TempENUM to a calling party identifier (CgPID). The TempENUM database stores a TempENUM from a coordinator system and relates the actual calling party identifier (CgPID) for use in callback attempts. Either during the initial call or communication, or shortly thereafter, the receiving party uses the TempENUM number to return communication the initial caller.

36 Claims, 5 Drawing Sheets

U.S. PATENT DOCUMENTS

| | | | |
|---|---|---|---|
| 6,865,266 B1* | 3/2005 | Pershan | 379/221.13 |
| 6,925,504 B1 | 8/2005 | Liskov | |
| 7,031,724 B2 | 4/2006 | Ross | |
| 7,194,249 B2 | 3/2007 | Phillips | |
| 7,516,198 B1 | 4/2009 | Appala | |
| 7,526,563 B2 | 4/2009 | Ingimundarson | |
| 7,617,287 B2 | 11/2009 | Vella | |
| 7,627,331 B2 | 12/2009 | Winterbottom | |
| 2001/0021646 A1 | 9/2001 | Antonucci et al. | |
| 2002/0055924 A1 | 5/2002 | Liming | |
| 2002/0099802 A1 | 7/2002 | Marsh | |
| 2002/0111159 A1* | 8/2002 | Faccin et al. | 455/422 |
| 2002/0136364 A1* | 9/2002 | Stumer et al. | 379/45 |
| 2002/0141386 A1 | 10/2002 | Minert | |
| 2002/0154221 A1 | 10/2002 | Ishimaru | |
| 2003/0063714 A1* | 4/2003 | Stumer et al. | 379/37 |
| 2003/0069002 A1 | 4/2003 | Hunter et al. | |
| 2003/0081752 A1* | 5/2003 | Trandal et al. | 379/210.01 |
| 2003/0081754 A1* | 5/2003 | Esparza et al. | 379/221.01 |
| 2003/0115261 A1 | 6/2003 | Mohammed | |
| 2003/0125021 A1 | 7/2003 | Tell et al. | |
| 2003/0222901 A1 | 12/2003 | Houck | |
| 2004/0064500 A1 | 4/2004 | Kolar et al. | |
| 2004/0107143 A1 | 6/2004 | Niemi | |
| 2004/0150518 A1 | 8/2004 | Phillips et al. | |
| 2004/0156394 A1* | 8/2004 | Westman | 370/471 |
| 2004/0157175 A1 | 8/2004 | Matsumoto | |
| 2004/0184584 A1 | 9/2004 | McCalmont | |
| 2004/0190497 A1* | 9/2004 | Knox | 370/352 |
| 2004/0203568 A1 | 10/2004 | Kirtland | |
| 2004/0203919 A1 | 10/2004 | Ross | |
| 2004/0242191 A1* | 12/2004 | Hossain et al. | 455/404.1 |
| 2004/0247090 A1 | 12/2004 | Nurmela | |
| 2005/0030977 A1 | 2/2005 | Casey et al. | |
| 2005/0039135 A1 | 2/2005 | Othmer | |
| 2005/0047399 A1 | 3/2005 | Lee et al. | |
| 2005/0125021 A1 | 6/2005 | Nance et al. | |
| 2005/0144322 A1* | 6/2005 | Miyajima et al. | 709/245 |
| 2005/0148353 A1 | 7/2005 | Hicks et al. | |
| 2005/0181805 A1 | 8/2005 | Gallagher | |
| 2005/0186948 A1 | 8/2005 | Gallagher | |
| 2005/0188078 A1 | 8/2005 | Kotzin | |
| 2005/0190892 A1* | 9/2005 | Dawson et al. | 379/37 |
| 2005/0195954 A1* | 9/2005 | Klein et al. | 379/201.04 |
| 2005/0202799 A1* | 9/2005 | Rollender | 455/404.1 |
| 2005/0213537 A1 | 9/2005 | Ingimundarson et al. | |
| 2005/0272424 A1 | 12/2005 | Gallagher | |
| 2005/0272449 A1 | 12/2005 | Gallagher | |
| 2005/0287979 A1* | 12/2005 | Rollender | 455/404.1 |
| 2006/0044407 A1 | 3/2006 | Barbeau | |
| 2006/0073812 A1 | 4/2006 | Punaganti | |
| 2006/0079236 A1* | 4/2006 | Del Pino et al. | 455/445 |
| 2006/0099935 A1 | 5/2006 | Gallagher | |
| 2006/0135177 A1 | 6/2006 | Winterbottom | |
| 2006/0154665 A1* | 7/2006 | Svensson et al. | 455/436 |
| 2006/0184617 A1 | 8/2006 | Nicholas | |
| 2006/0189303 A1* | 8/2006 | Rollender | 455/417 |
| 2006/0205383 A1* | 9/2006 | Rollender | 455/404.1 |
| 2006/0236258 A1 | 10/2006 | Othmer | |
| 2007/0008885 A1 | 1/2007 | Bonner | |
| 2007/0027997 A1 | 2/2007 | Polk | |
| 2007/0060097 A1 | 3/2007 | Edge | |
| 2007/0190968 A1 | 8/2007 | Dickinson | |
| 2007/0202844 A1 | 8/2007 | Wilson | |
| 2007/0218871 A1 | 9/2007 | Bonner | |
| 2007/0238448 A1 | 10/2007 | Gallagher | |
| 2008/0080488 A1* | 4/2008 | Marsico | 370/352 |

OTHER PUBLICATIONS

Harry Newton, Newton's Telecom Dictionary, Feb. 2000, Telecom Books, 16th edition, p. 427.*

PCT Notification of Transmittal of the International Search Report and the Written Opinion of the International Searching Authority, or the Declaration, Feb. 14, 2008.

European Search Report in Appl. No. EP07 71 6216 dated Dec. 12, 2009.

Zehua et al., "On Querying Geospatial and Georeferenced Metadata Resources in G-Portal," IEEE Comp. SOC, May 31, 2003, pp. 245-255.

Peterson et al., "A Presence-Based GEOPRIV Location Object Format; rfc4119,txt," Neustar, Dec. 1, 2005, pp. 1-23.

Winterbottom, et al., "GEOPRIV PIDF-Lo Usage Clarification, Considerations and Recommendations; draft-ietf-geopriv-pdif-lo-profile-00.txt," Nortel, Jul. 2, 2005, pp. 1-31.

Berners-Lee, et al., "Uniform Resource Identifier (URI) Generic Standard, Internet Engineering Task Force," Day Software, Jan. 1, 2005, pp. 1-61.

* cited by examiner

TEMPORARY ENUM GATEWAY

The present application claims priority from U.S. Provisional Application No. 60/670,279, entitled "Temporary ENUM Gateway", filed Apr. 12, 2005, to Mitchell, the entirety of which is expressly incorporated herein by reference.

BACKGROUND OF THE INVENTION

1. Field of the Invention

This invention relates generally to wireless devices and voice over Internet Protocol (VoIP) technologies. More particularly, it relates to ENUM services.

2. Background of the Related Art

Electronic numbering (ENUM) services have been called implementation of a 'phone number for life'. Just like a social security number follows a person for life, ENUM envisions use of a single simple telephone number to access a person over any applicable medium (e.g., telephone network, FAX, Internet, etc.) Thus, as currently envisioned, electronic numbering (ENUM) services give subscribers a single telephone number that can be used to access any of their communications services or devices via an Internet Protocol (IP) network, e.g., voice, fax, email, short message service (SMS), etc.

For use in the Internet world, ENUM is a protocol for mapping a telephone number to a Uniform Resource Identifier (URI) which can be used to contact a resource associated with that number. ENUM in this scenario therefore gives access to a wide range of a person's (communication) identifiers by looking up a specific domain associated with that person's telephone number.

In operation, an ENUM service receives a dialed (or addressed) phone number, and uses a mathematical formula and lookup table(s) to resolve it to an Internet Uniform Resource Identifier (URI) for the subscriber's ENUM Naming Authority Pointer (NAPTR) record, a repository of communications access information. The service then routes the call or communication to a service provider based on the type of request, e.g., voice, fax, email, etc., and any preferences established by the subscriber.

Thus, VoIP service providers and IP network managers can avoid the costs and any applicable regulatory hassles associated with having to assign public switched telephone network (PSTN) numbers and use PSTN networks to route calls when both parties are using voice over Internet Protocol (VoIP).

For VoIP users, ENUM makes IP communications easier and ultimately less expensive. It gives subscribers control of the way that they're contacted by providing them with customized configuration of their own NAPTR, e.g., using a simple web interface. Others can contact a subscriber even when they don't know where the person is or how they want to be contacted, simply using their ENUM. With ENUM, users can dial Internet-based communications services even from numeric-only devices, including non-IP mobile and wireline phones.

ENUM technology in general helps ease the transition from circuit-switched to voice over Internet protocol (VoIP) communications. However, there are particular problems using ENUM services with respect to international callers. For example, an international caller using ENUM services in the US might dial 9-1-1. However, conventional ENUM services cannot successfully deliver a full callback phone number of the international caller to a 9-1-1 answering agency such as a public safety answering point (PSAP). This is because of restrictions caused by the North American Numbering Plan (NANP). In particular, the NANP requires use of 10-digit fields to transmit information. In this type case, an originator of communication (voice, text or video) cannot pass the required re-contact information to the end point because the international caller's number may not fit within the confines of the NANP 10-digit information field.

There is a need for a suitable method and apparatus for reliably providing callback number information for all callers from all sources within an electronic numbering (ENUM) architecture.

SUMMARY OF THE INVENTION

In accordance with the principles of the present invention, an electronic numbering (ENUM) gateway comprises a temporary ENUM database associating a plurality of ENUMs with respective caller identity information. A module assigns a temporary ENUM at a time of routing a given communication. The temporary ENUM is an entry in the temporary ENUM database. A module looks up in the temporary ENUM database a given temporary ENUM, and retrieves associated caller identity information.

A method of temporarily associating an electronic number (ENUM) to a given communication for a short period of time contemporaneous with transmission of the given communication in accordance with another aspect of the invention comprises receiving a request for a temporary ENUM relating to a given communication. The temporary ENUM conforms to a format for calling party identity information as required by a called party. A temporary ENUM is associated with caller identity information relating to a caller initiating the given communication. The associated temporary ENUM is stored as an entry in a temporary ENUM database.

DETAILED DESCRIPTION OF ILLUSTRATIVE EMBODIMENTS

Current electronic numbering (ENUM) technology requires the user to apply for a permanent DNS assigned 10-digit North American Numbering Plan (NANP) number in the US. The present invention provides a temporary ENUM, or "TempENUM", architecture that assigns a temporary ENUM number at call time. The ENUM number in the disclosed embodiments is assigned substantially only for the duration of the call or communication.

For an originated communication requiring routing to a party which needs a particular callback format not supported, e.g., by the originator, a TempENUM service in accordance with the principles of the present invention assigns a callback identifier (ID) in a format consistent with that required by the receiving party.

Figure 1:
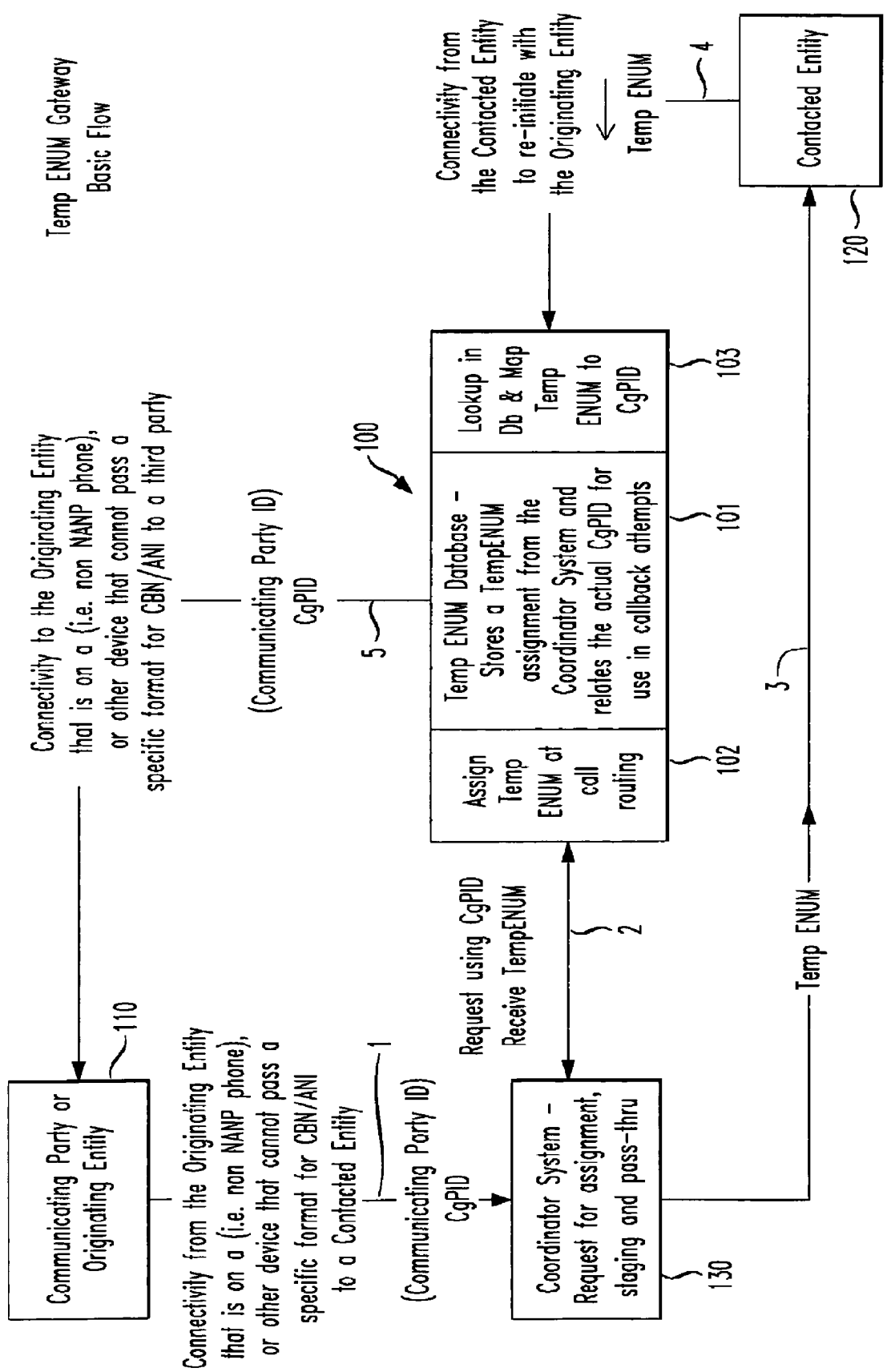
FIG. 1 shows exemplary basic message flow relating to a Temp ENUM Gateway, in accordance with the principles of the present invention.

FIG. 1 shows exemplary basic message flow relating to a Temp ENUM Gateway, in accordance with the principles of the present invention.

In particular, FIG. 1 shows a communicating party or originating entity 110 that places a call to a contacted entity or receiving party 120. The call is processed through an appropriate gateway provisioned to be a coordinator system 130.

Importantly, a temporary ENUM (TempENUM) service gateway 100 is implemented, including a TempENUM database 101, a module 102 that assigns a suitable TempENUM at the time of call routing, and a module 103 that handles a lookup in the TempENUM database 101, and maps the assigned TempENUM to a calling party identifier (CgPID).

The TempENUM database 101 stores a TempENUM assignment from the coordinator system 130 and relates the actual calling party identifier (CgPID) for use in callback attempts.

In step 1 shown in FIG. 1, the originating party 110 attempts communication to a receiving party 120 that preferably receives the communication with an identifying ID used for re-contact, but the originating party's communication method is unable to provide that specific ID format.

In step 2, the communication is routed to an appropriate temporary ENUM numbering service, i.e., to the TempENUM service gateway 100. The temporary ENUM numbering service, or TempENUM service gateway 100, receives a temporary ID (Temp ENUM) from an appropriate module 102 that assigns a suitable TempENUM at the time of call routing, and routes the call. As shown in FIG. 1, the module 102 is preferably part of a temporary ENUM service.

Importantly, the temporary ID (or TempENUM) is consistent with the specific format required by the receiving party 120.

In step 3, the communication is routed to the receiving party 120 with an appropriate Temp ENUM specific to the format requirements of the receiving party 120.

In step 4, the receiving party 120 communicates with the originating party 110 substantially immediately after termination of a session. The receiving party 120 then uses the received TempENUM number to callback or re-initiate communication with the originating party 110 as required, e.g., within a predetermined time.

The callback communication attempt is directed to the TempENUM service gateway 100. In the given embodiments, the TempENUM service gateway 100 performs an appropriate authorization process intended to verify validity of the callback communication attempt back to the originating party 110. Validity may be based upon, e.g., the location of the communication attempt, date and time, etc.

If the re-initiated callback communication attempt is valid and authorized, then the TempENUM service gateway 100 correlates the TempENUM (i.e., temporary identifier) with the actual callback number or other communication identifier of the originating party 110.

In step 5, the callback communication attempt by the receiving party 120 is completed back to the originating party 110.

Figure 2:
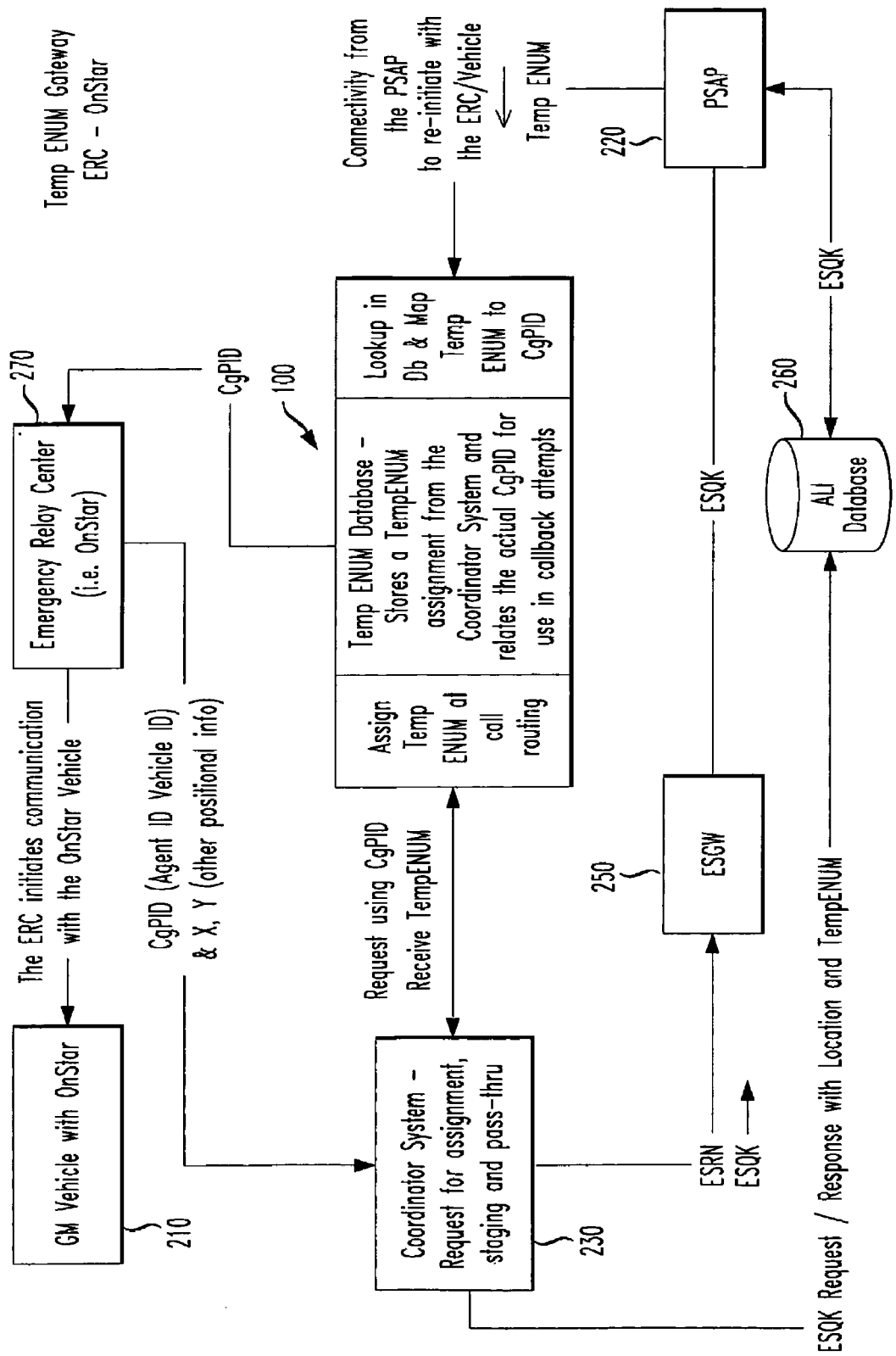
FIG. 2 shows exemplary message flow relating to a temporary ENUM service gateway in use with a roadside assistance/emergency relay center, in accordance with the principles of the present invention.

FIG. 2 shows exemplary message flow relating to a temporary ENUM service gateway in use with a roadside assistance/emergency relay center, in accordance with the principles of the present invention.

In particular, FIG. 2 shows interaction between an automobile equipped with a telematics system 210, its servicing telematics operations center 270, a coordinator system gateway 230, and a TempENUM service gateway 100. Otherwise conventional location elements are also accessed, including an emergency services gateway 250, a public safety access point 220, and an automatic location identifier (ALI) database 260.

The automobile 210 equipped with a suitable telematics system 210 (e.g., ONSTAR™ from General Motors™, TeleAID™ from Mercedes-Benz™, etc.) attempts to contact a public safety access point (PSAP) 220. In the given embodiment, the PSAP 220 is provided with a callback mechanism to re-initiate contact with the emergency caller 210 should the initial call be accidentally or unintentionally dropped.

An emergency relay center (e.g., ONSTAR™ telematics service center) 270 provides service to the automobile 210. The emergency relay center 270 passes an emergency call from the automobile 210 to the appropriate PSAP 220 via an appropriate gateway provisioned as a coordinator system 230. In the disclosed embodiment, the emergency call is passed to the coordinator system 230 together with a calling party identifier (CgPID) such as an agent ID, vehicle ID, etc., together with appropriate X, Y (latitude/longitude) positional information.

As described with respect to the basic flow of FIG. 1, the coordinator system 230 initiates a TempENUM request to the TempENUM service gateway 100 including the calling party callback identifier (CgPID). The TempENUM service gateway 100 assigns an appropriate TempENUM, which it passes back to the coordinator system 230.

Location of the automobile 210 is provided through the use of an emergency services routing number (ESRN) and emergency services query key (ESQK) (e.g., in a voice over Internet Protocol (VoIP) network). An emergency services gateway (ESGW) 250 receives the ESRN and ESQK from the coordinator system 230, and selects the PSAP trunk using the ESRN and then passes ESQK on to that same PSAP 220 (if in a VoIP network).

The PSAP 220 queries an automatic location identifier (ALI) database 260 for the location of the emergency caller 210. The ALI database 260 is updated with location information using an ESQK request to the coordinator system 230. The coordinator system 230 responds to the PSAP 220 (via the ALI database 260) with current location information relating to the automobile 210, and the assigned TempENUM relating to the relevant emergency call.

Finally, as necessary (or desired), the receiving party (in this case the PSAP 220) attempts a callback communication to the originating party (in this case the automobile 210). This callback attempt is directed towards the TempENUM service gateway 100. The TempENUM service gateway 100 performs a lookup in the TempENUM database, and maps the provided TempENUM to the temporarily stored calling party identifier associated with that TempENUM.

The callback communications routed using the retrieved calling party identifier, which in this case directs the callback communication to the emergency relay center 270, which in turn passes the callback communication to the automobile 210.

Figure 3:
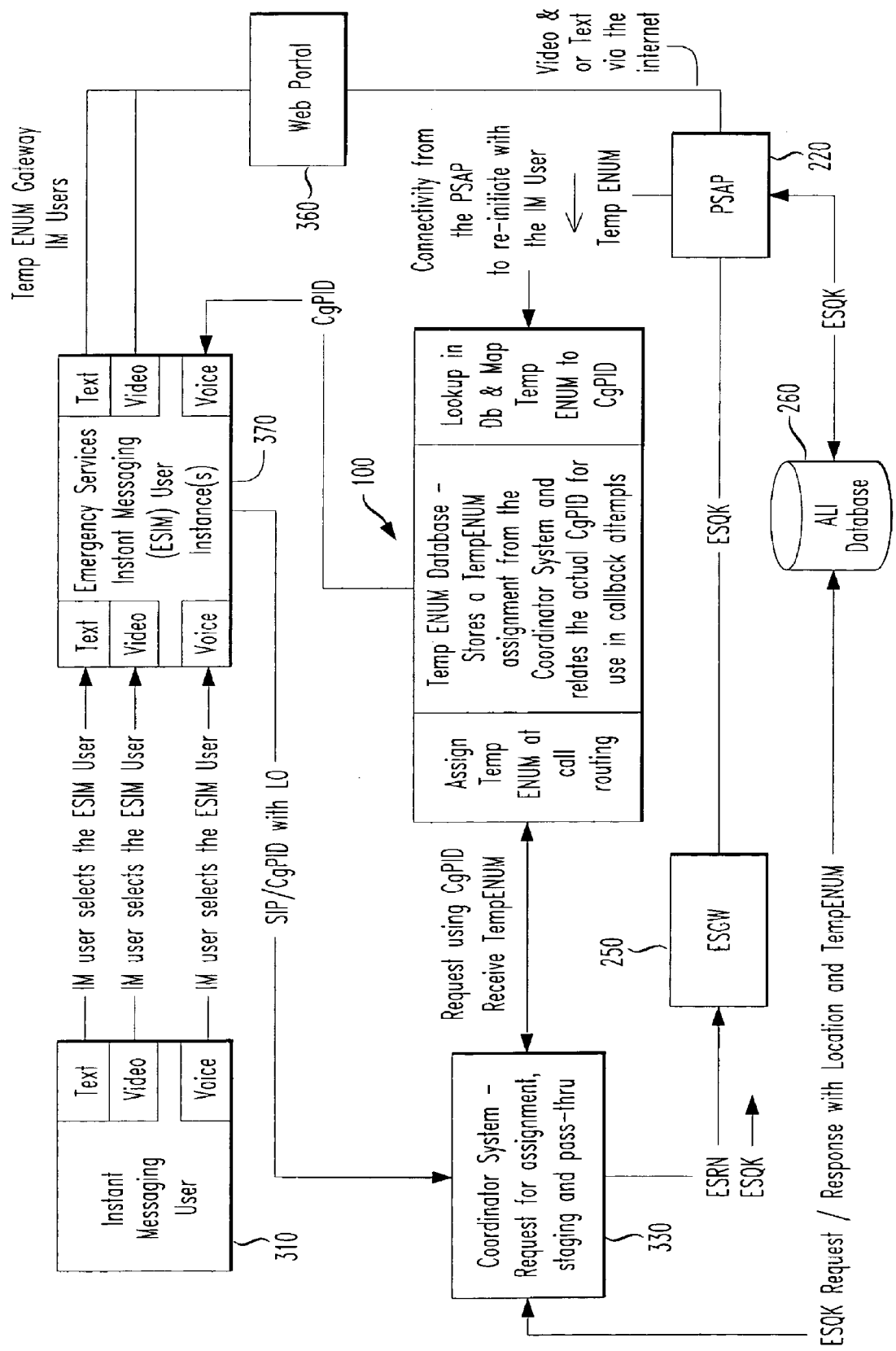
FIG. 3 shows exemplary message flow relating to a temporary ENUM service gateway in use with Instant Messaging services, in accordance with the principles of the present invention.

FIG. 3 shows exemplary message flow relating to a temporary ENUM service gateway in use with Instant Messaging services, in accordance with the principles of the present invention.

In particular, FIG. 3 shows interaction between an instant messaging user 310, their servicing emergency services instant messaging (ESIM) user instance(s) 370, a coordinator system gateway 330, and a TempENUM service gateway 100. Otherwise conventional location elements are also accessed, including an emergency services gateway 250, a public safety access point 220, and an automatic location identifier (ALI) database 260. In the disclosed embodiment, the PSAP 220 is able to access relevant text and/or video from the instant messaging user 310 via an appropriate web portal 360.

The instant messaging user 310 sends an instant message with text, video or voice to an appropriate PSAP 220. In the given embodiment, the PSAP 220 is provided with a callback mechanism to reply to the instant messaging user 310.

Upon messaging, a relevant user instance (text, video or voice) is established in an appropriate emergency services instant messaging (ESIM) gateway 370. The text, video or voice instant message sent by the instant messaging user 310, or to the instant messaging user 310 from a suitable Internet host (e.g., a web portal 360), is also established in the emergency services instant messaging (ESIM) gateway 370.

The ESIM gateway 370 passes the instant message from the instant messaging user 310 to the appropriate PSAP 220 via an appropriate gateway provisioned as a coordinator system 330. In the disclosed embodiment, the emergency instant message is passed to the coordinator system 330 using a SIP INVITE command, together with a calling party identifier (CgPID) with LO.

As described with respect to the basic flow of FIG. 1, the coordinator system 330 initiates a TempENUM request to the TempENUM service gateway 100 including the calling party callback identifier (CgPID). The TempENUM service gateway 100 assigns an appropriate TempENUM, which it passes back to the coordinator system 330.

Location of the messaging user 310 is provided through the use of an emergency services router number (ESRN) and emergency services query key (ESQK) (e.g., over the Internet). An emergency services gateway (ESGW) 250 receives the ESRN and ESQK from the coordinator system 330, and passes the ESQK on to the PSAP 220 (if over the internet).

The PSAP 220 queries an automatic location identifier (ALI) database 260 for the location of the emergency calling instant messaging user 310. The ALI database 260 is updated with location information using an ESQK request to the coordinator system 330. The coordinator system 330 responds to the PSAP 220 (via the ALI database 260) with current location information relating to the instant messaging user 310, and the assigned TempENUM relating to the relevant emergency instant message.

Finally, as necessary (or desired), the receiving party (in this case the PSAP 220) attempts a callback communication to the originating party (in this case a return instant message to the instant messaging user 310). This return instant message is directed towards the TempENUM service gateway 100. The TempENUM service gateway 100 performs a lookup in the TempENUM database, and maps the provided TempENUM to the temporarily stored calling party identifier (in this case an instant messaging user identifier) associated with that TempENUM.

The return communication is routed using the retrieved calling party identifier, which in this case directs the return instant message to the emergency services instant messaging (ESIM) user instance(s) 370, and in turn passes the return instant message to the instant messaging user 310.

Figure 4:
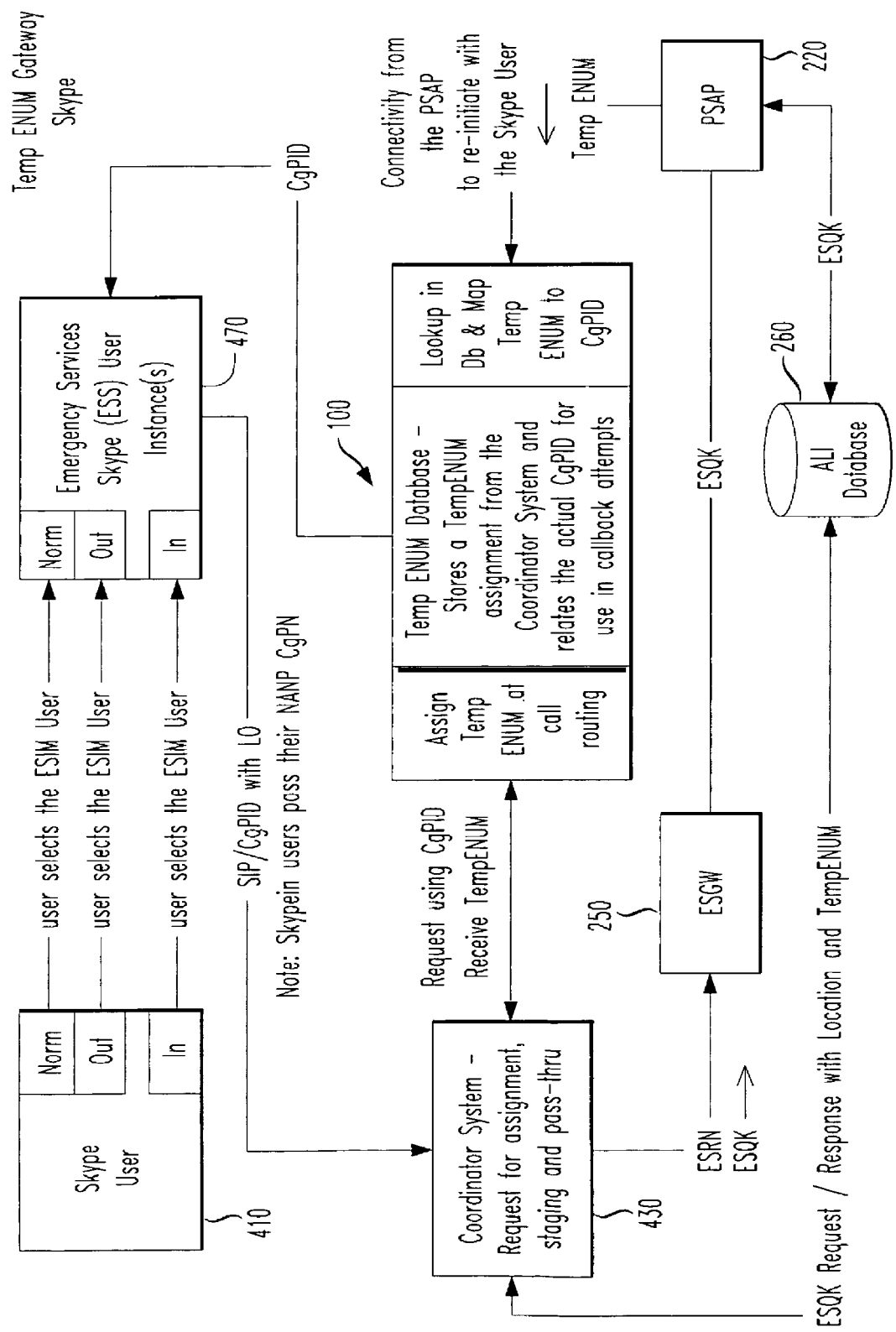
FIG. 4 shows exemplary message flow relating to a temporary ENUM service gateway in use with Peer-To-Peer voice provider services, in accordance with the principles of the present invention.

FIG. 4 shows exemplary message flow relating to a temporary ENUM service gateway in use with Peer-To-Peer voice provider services, in accordance with the principles of the present invention.

In particular, FIG. 4 shows interaction between a personal computer (PC) based VoIP application (e.g., Skype™) user 410, their servicing emergency services Skype™ (ESS) gateway including user instance(s) 470, a coordinator system gateway 430, and a TempENUM service gateway 100. Otherwise conventional location elements are also accessed, including an emergency services gateway 250, a public safety access point 220, and an automatic location identifier (ALI) database 260.

The PC based VoIP application user 410 attempts to call via the Internet an appropriate PSAP 220. In the given embodiment, the PSAP 220 is provided with a callback mechanism to reply to the PC based VoIP application user 410.

Upon initiation of a VoIP call, a relevant user instance (IN, OUT and NORM) is established in the PC hosting the VoIP application, as well as in an appropriate Emergency Services Skype (ESS) gateway 470.

The ESS gateway 470 passes the VoIP call from the Skype™ user 410 to the appropriate PSAP 220 via an appropriate gateway provisioned as a coordinator system 430. In the disclosed embodiment, the emergency VoIP call is passed to the coordinator system 430 using a SIP INVITE command, together with a calling party identifier (CgPID) with LO. Note that Skype™ users pass their North American Numbering Plan (NANP) calling party number (CgPN) to the coordinator system 430.

As described with respect to the basic flow of FIG. 1, the coordinator system 430 initiates a TempENUM request to the TempENUM service gateway 100 including the calling party callback identifier (CgPID). The TempENUM service gateway 100 assigns an appropriate TempENUM, which it passes back to the coordinator system 430.

Location of the PC based VoIP application user 410 is provided through the use of an emergency services routing number (ESRN) (e.g., in a switched network) and emergency services query key (ESQK) (e.g., over the internet). An emergency services gateway (ESGW) 250 receives the ESRN and ESQK from the coordinator system 330, and passes the ESQK on to the PSAP 220 (of over the internet).

The PSAP 220 queries an automatic location identifier (ALI) database 260 for the location of the emergency calling PC based VoIP application user 410. The ALI database 260 is updated with location information using an ESQK request to the coordinator system 430. The coordinator system 430 responds to the PSAP 220 (via the ALI database 260) with current location information relating to the PC based VoIP application user 410, and the assigned TempENUM relating to the relevant emergency VoIP call.

Finally, as necessary (or desired), the receiving party (in this case the PSAP 220) attempts a callback call to the originating party (in this case PC based VoIP application user 410). This callback call is directed towards the TempENUM service gateway 100. The TempENUM service gateway 100 performs a lookup in the TempENUM database, and maps the provided TempENUM to the temporarily stored calling party identifier associated with that TempENUM.

The return communication is routed using the retrieved calling party identifier, which in this case directs the return call to the emergency services instant messaging (ESIM) user instance(s) 370, and in turn to the PC based VoIP application user 410.

Figure 5:
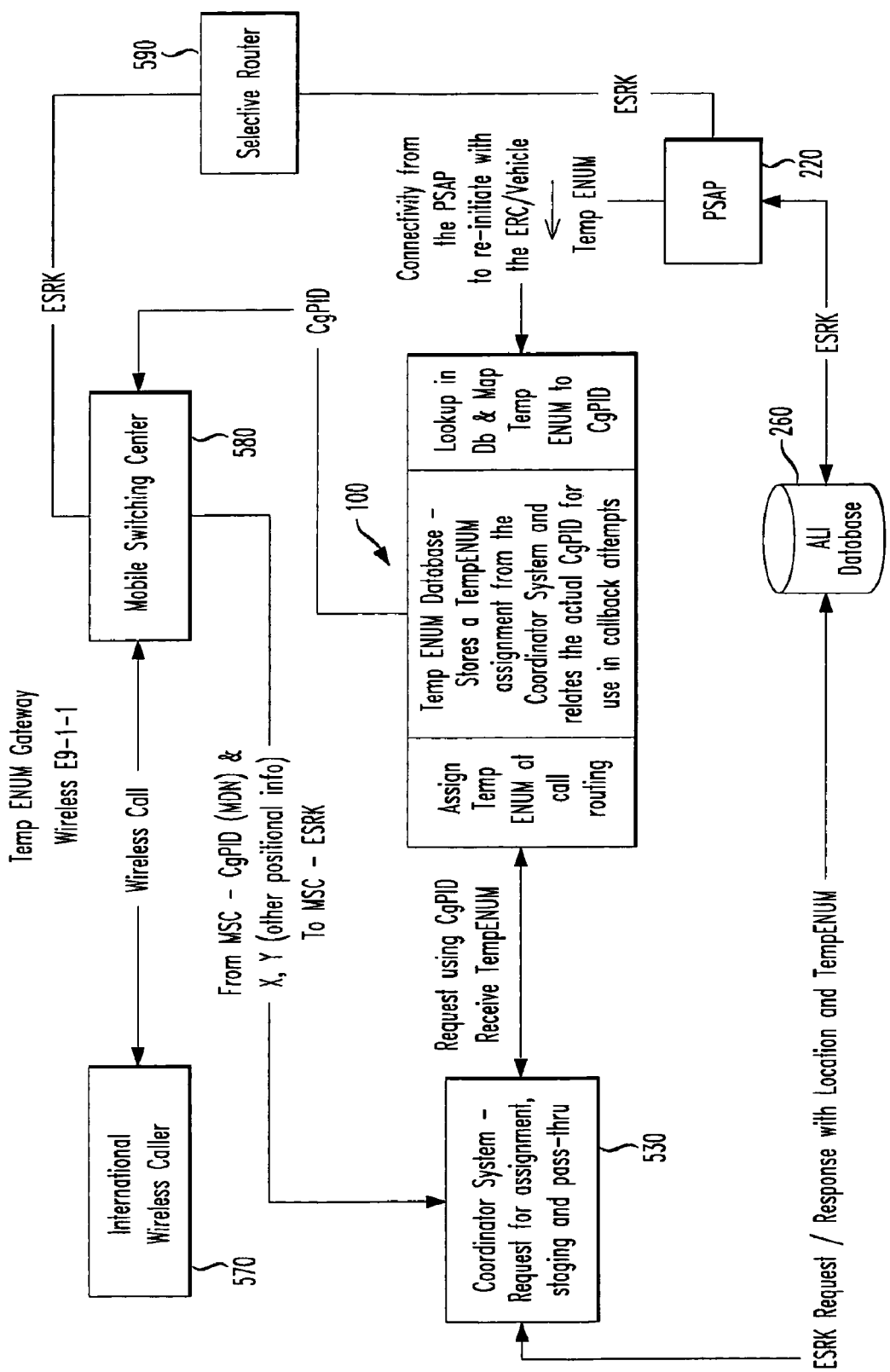
FIG. 5 shows exemplary message flow relating to a temporary ENUM service gateway in use with wireless E9-1-1 services, in accordance with the principles of the present invention.

FIG. 5 shows exemplary message flow relating to a temporary ENUM service gateway in use with wireless E9-1-1 services, in accordance with the principles of the present invention.

In particular, FIG. 5 shows interaction between an international wireless caller 510 (e.g., a caller with a callback number that is larger or otherwise non-conforming to NANP 10-digit format), a servicing mobile switching center (MSC) 580, a coordinator system gateway 530, and a TempENUM service gateway 100. Otherwise conventional location elements are also accessed, including a public safety access point 220, and an automatic location identifier (ALI) database 260.

The international wireless caller 510 attempts to contact the appropriate public safety access point (PSAP) 220. In the given embodiment, the PSAP 220 is provided with a callback mechanism to re-initiate contact with the international wireless caller 510 as necessary or desired (e.g., should the initial call be accidentally or unintentionally dropped).

The mobile switching center (MSC) 580 provides service to the international wireless caller 510. The MSC 580 passes an emergency call from the international wireless caller 510 to the appropriate PSAP 220 via an appropriate gateway provisioned as a coordinator system 530. In the disclosed embodiment, the emergency call is passed from the MSC 580 to the coordinator system 530 together with a calling party identifier (CgPID) such as a mobile directory number (MDN), together with appropriate X, Y (latitude/longitude) positional information.

As described with respect to the basic flow of FIG. 1, the coordinator system 530 initiates a TempENUM request to the TempENUM service gateway 100 including the calling party callback identifier (CgPID). The TempENUM service gateway 100 assigns an appropriate TempENUM, which it passes back to the coordinator system 530.

Location of the international wireless caller 510 is provided through the use of an emergency services query key (ESQK). The coordinator system 530 requests assignment of the TempENUM from the TempENUM services gateway 100, and then passes the emergency call through to the PSAP 220 indicated by a query to the ALI database 260. The ALI database 260 provides the appropriate emergency services routing key (ESRK) to the PSAP 220.

The ALI database 260 is updated with location information using an ESQK request to the coordinator system 530. The coordinator system 530 responds to the PSAP 220 (via the ALI database 260) with current location information relating to the international wireless caller 510, and the assigned TempENUM relating to the relevant emergency call.

Finally, as necessary (or desired), the receiving party (in this case the PSAP 220) attempts a callback communication to the originating party (in this case the wireless international caller 510). This callback attempt is directed towards the TempENUM service gateway 100. The TempENUM service gateway 100 performs a lookup in the TempENUM database , and maps the provided TempENUM to the temporarily stored calling party identifier associated with that TempENUM.

The callback communications are routed using the retrieved calling party identifier, which in this case means that the callback communication is directed to the MSC 580 servicing the international wireless caller 510, and ultimately to the international wireless caller 510.

The present invention has particular applicability in the wireless E9-1-1 market, including any US GSM carrier that supports PCS frequencies used by foreign markets. Other applications include roadside assistance/emergency relay centers, instant messaging providers, and peer-to-peer voice providers. There is also particular applicability with VoIP operators, particularly VoIP operators that support Mobile/Nomadic International subscribers, VoIP operators wishing to market International numbers for North American subscribers, and VoIP operators with subscribers that don't want to sign up in the ENUM directory.

While the invention has been described with reference to the exemplary embodiments thereof, those skilled in the art will be able to make various modifications to the described embodiments of the invention without departing from the true spirit and scope of the invention.

What is claimed is:

1. An electronic numbering (ENUM) gateway, comprising:
   an ENUM receiving module to receive a call directed to an ENUM receiving entity and associated with non-ENUM conforming caller identity information, said ENUM receiving entity mapping an ENUM with external resources associated with said ENUM;
   a temporary ENUM database to associate a temporary conforming ENUM with said non-ENUM conforming caller identity information;
   a module to assign said temporary conforming ENUM at a time of routing of a given communication, said temporary conforming ENUM being an entry in said temporary ENUM database; and
   a module to lookup said temporary conforming ENUM in said temporary ENUM database and retrieve said associated caller identity information.

2. The electronic numbering (ENUM) gateway according to claim 1, wherein:
   said entry in said temporary ENUM database is a temporary entry that expires after a given amount of time after termination of said given communication.

3. The electronic numbering (ENUM) gateway according to claim 1, wherein said caller identity information comprises:
   a phone number of a user initiating said given communication.

4. The electronic numbering (ENUM) gateway according to claim 3, wherein:
   said phone number does not conform to a 10-digit North American Numbering Plan phone number.

5. The electronic numbering (ENUM) gateway according to claim 3, wherein:
   said phone number includes a country code.

6. The electronic numbering (ENUM) gateway according to claim 1, wherein said caller identity information comprises:
   an email address of a user initiating said given communication.

7. The electronic numbering (ENUM) gateway according to claim 1, wherein said caller identity information comprises:
   an instant messaging address of a user initiating said given communication.

8. The electronic numbering (ENUM) gateway according to claim 1, wherein said caller identity information comprises:
   a vehicle ID.

9. The electronic numbering (ENUM) gateway according to claim 1, wherein said caller identity information comprises:
   a mobile directory number (MDN).

10. The electronic numbering (ENUM) gateway according to claim 1, wherein:
    said temporary ENUM gateway forms a temporary ENUM service.

11. The electronic numbering (ENUM) gateway according to claim 1, wherein:

said temporary conforming ENUM conforms to requirements of a called party relating to calling party identification information.

12. The electronic numbering (ENUM) gateway according to claim 11, wherein:
said temporary conforming ENUM conforms to 10-digit North American Numbering Plan requirements.

13. The electronic numbering (ENUM) gateway according to claim 1, wherein:
said given communication is an instant message.

14. The electronic numbering (ENUM) gateway according to claim 1, wherein:
said given communication is a phone call.

15. The electronic numbering (ENUM) gateway according to claim 14, wherein:
said phone call is a wireless phone call.

16. The electronic numbering (ENUM) gateway according to claim 14, wherein:
said phone call is a voice over Internet Protocol (VoIP) phone call.

17. A method of temporarily associating an electronic number (ENUM) to a given communication for a short period of time contemporaneous with transmission of said given communication, comprising:
receiving a call directed to an ENUM receiving entity and associated with non-ENUM conforming caller identity information, said ENUM receiving entity mapping an ENUM with external resources associated with said ENUM;
receiving a request for a temporary conforming ENUM relating to said non-ENUM conforming caller identity information;
associating said temporary conforming ENUM with said non-ENUM conforming caller identity information; and
storing said associated temporary conforming ENUM as an entry in a temporary ENUM database.

18. The method of temporarily associating an electronic number (ENUM) to a given communication for a short period of time contemporaneous with transmission of said given communication according to claim 17, further comprising:
receiving a request to lookup said temporary conforming ENUM; and
retrieving from said temporary ENUM database said given temporary conforming ENUM associated with said non-conforming caller identity information.

19. The method of temporarily associating an electronic number (ENUM) to a given communication for a short period of time contemporaneous with transmission of said given communication according to claim 17, further comprising:
routing a return communication from said called party back to said caller.

20. The method of temporarily associating an electronic number (ENUM) to a given communication for a short period of time contemporaneous with transmission of said given communication according to claim 17, wherein:
said temporary conforming ENUM conforms to requirements of a called party relating to calling party identification information.

21. The method of temporarily associating an electronic number (ENUM) to a given communication for a short period of time contemporaneous with transmission of said given communication according to claim 20, wherein:
said temporary conforming ENUM conforms to 10-digit North American Numbering Plan requirements.

22. The method of temporarily associating an electronic number (ENUM) to a given communication for a short period of time contemporaneous with transmission of said given communication according to claim 17, wherein:
said received request includes calling party information.

23. The method of temporarily associating an electronic number (ENUM) to a given communication for a short period of time contemporaneous with transmission of said given communication according to claim 22, wherein said calling party information includes:
a phone number.

24. The method of temporarily associating an electronic number (ENUM) to a given communication for a short period of time contemporaneous with transmission of said given communication according to claim 22, wherein said calling party information includes:
an instant message IP address.

25. The method of temporarily associating an electronic number (ENUM) to a given communication for a short period of time contemporaneous with transmission of said given communication according to claim 22, wherein said calling party information includes:
a mobile directory number (MDN).

26. The method of temporarily associating an electronic number (ENUM) to a given communication for a short period of time contemporaneous with transmission of said given communication according to claim 22, wherein said calling party information includes:
an email address.

27. Apparatus for temporarily associating an electronic number (ENUM) to a given communication for a short period of time contemporaneous with transmission of said given communication, comprising:
means for receiving a call directed to an ENUM receiving entity and associated with non-ENUM conforming caller identity information, said ENUM receiving entity mapping an ENUM with external resources associated with said ENUM;
means for receiving a request for a temporary conforming ENUM relating to said non-ENUM conforming caller identity information;
means for associating said temporary conforming ENUM with said non-conforming caller identity information; and
means for storing said associated temporary conforming ENUM as an entry in a temporary ENUM database.

28. The apparatus for temporarily associating an electronic number (ENUM) to a given communication for a short period of time contemporaneous with transmission of said given communication according to claim 27, further comprising:
means for receiving a request to lookup said temporary conforming ENUM; and
means for retrieving from said temporary ENUM database said given temporary conforming ENUM associated with said non-conforming caller identity information.

29. The apparatus for temporarily associating an electronic number (ENUM) to a given communication for a short period of time contemporaneous with transmission of said given communication according to claim 27, further comprising:
means for routing a return communication from said called party back to said caller.

30. The apparatus for temporarily associating an electronic number (ENUM) to a given communication for a short period of time contemporaneous with transmission of said given communication according to claim 27, wherein:
said temporary conforming ENUM conforms to requirements of a called party relating to calling party identification information.

31. The apparatus for temporarily associating an electronic number (ENUM) to a given communication for a short period of time contemporaneous with transmission of said given communication according to claim 30, wherein:
said temporary conforming ENUM conforms to 10-digit North American Numbering Plan requirements.

32. The apparatus for temporarily associating an electronic number (ENUM) to a given communication for a short period of time contemporaneous with transmission of said given communication according to claim 27, wherein:
said received request includes calling party information.

33. The apparatus for temporarily associating an electronic number (ENUM) to a given communication for a short period of time contemporaneous with transmission of said given communication according to claim 32, wherein said calling party information includes:
a phone number.

34. The apparatus for temporarily associating an electronic number (ENUM) to a given communication for a short period of time contemporaneous with transmission of said given communication according to claim 32, wherein said calling party information includes:
an instant message IP address.

35. The apparatus for temporarily associating an electronic number (ENUM) to a given communication for a short period of time contemporaneous with transmission of said given communication according to claim 32, wherein said calling party information includes:
a mobile directory number (MDN).

36. The apparatus for temporarily associating an electronic number (ENUM) to a given communication for a short period of time contemporaneous with transmission of said given communication according to claim 32, wherein said calling party information includes:
an email address.

* * * * *